(12) United States Patent
Zhou et al.

(10) Patent No.: US 10,127,236 B1
(45) Date of Patent: Nov. 13, 2018

(54) FILESYSTEM STORING FILE DATA IN LARGER UNITS THAN USED FOR METADATA

(71) Applicant: EMC Corporation, Hopkinton, MA (US)

(72) Inventors: Yingchao Zhou, Beijing (CN); William C. Davenport, Burlington, MA (US); Christopher A. Seibel, Walpole, MA (US); Jun Guo, Beijing (CN); Jia Zhai, Beijing (CN); Wengang Wang, Beijing (CN); Philippe Armangau, Acton, MA (US)

(73) Assignee: EMC IP Holding Company, Hopkinton, MA (US)

( * ) Notice: Subject to any disclaimer, the term of this patent is extended or adjusted under 35 U.S.C. 154(b) by 110 days.

(21) Appl. No.: 13/928,972

(22) Filed: Jun. 27, 2013

(51) Int. Cl.
- G06F 12/00 (2006.01)
- G06F 13/30 (2006.01)
- G06F 17/30 (2006.01)

(52) U.S. Cl.
CPC .............................. *G06F 17/30091* (2013.01)

(58) Field of Classification Search
CPC ........... G06F 17/3007; G06F 17/30115; G06F 17/30132; G06F 17/30093; G06F 3/067
USPC ........................................................ 707/822
See application file for complete search history.

(56) References Cited

U.S. PATENT DOCUMENTS

| | | | |
|---|---|---|---|
| 7,594,085 B1 * | 9/2009 | Rao | 711/159 |
| 7,765,244 B2 * | 7/2010 | Rajakarunanayake | 707/823 |
| 7,996,445 B2 * | 8/2011 | Fair | G06F 3/061 707/813 |
| 8,285,757 B2 * | 10/2012 | Xi | G06F 17/30067 707/821 |
| 8,285,967 B1 * | 10/2012 | Veeraswamy et al. | 711/202 |
| 8,793,290 B1 * | 7/2014 | Pruthi et al. | 707/821 |
| 2004/0225714 A1 * | 11/2004 | Watanabe | G06F 12/0866 709/203 |
| 2005/0132126 A1 * | 6/2005 | Lin | G06F 3/0614 711/103 |
| 2005/0188248 A1 * | 8/2005 | O'Brien | G06F 3/0607 714/5.11 |

(Continued)

OTHER PUBLICATIONS

Karthick Jayaraman, "How to Manipulate the Inode Structure?", Syracuse University, 6 pages, accessed Jun. 18, 2013 from <http://www.cis.syr.edu/~wedu/seed/Documentation/Minix3/Inode.pdf>.

(Continued)

*Primary Examiner* — Hosain Alam
*Assistant Examiner* — Nicholas Allen
(74) *Attorney, Agent, or Firm* — BainwoodHuang (57) ABSTRACT

A method is provided for storing files in a filesystem of a data storage system. The method includes (a) storing data of each file of a set of files of the filesystem in a set of data allocation units (AUs) of the filesystem on the data storage system, each data AU of the set of data AUs having a common data AU size, and (b) storing metadata pertaining to each file of the set of files in a set of metadata AUs of the filesystem on the data storage system, each metadata AU of the set of metadata AUs having a common metadata AU size, the common data AU size being larger than the common metadata AU size. A computerized apparatus and a computer program product are also provided for performing a method similar to that described above.

18 Claims, 4 Drawing Sheets

(56) References Cited

U.S. PATENT DOCUMENTS

| | | | |
|---|---|---|---|
| 2005/0234867 A1* | 10/2005 | Shinkai | G06F 17/30165 |
| 2006/0161642 A1* | 7/2006 | Bopardikar | G06F 3/061 |
| | | | 709/219 |
| 2006/0288026 A1* | 12/2006 | Zayas et al. | 707/101 |
| 2007/0226443 A1* | 9/2007 | Giampaolo | 711/170 |
| 2007/0260842 A1* | 11/2007 | Faibish | G06F 3/061 |
| | | | 711/170 |
| 2008/0005468 A1* | 1/2008 | Faibish | G06F 3/0622 |
| | | | 711/114 |
| 2008/0077590 A1* | 3/2008 | Pandit | G06F 11/1435 |
| 2008/0270461 A1* | 10/2008 | Gordon | G06F 3/0608 |
| 2008/0320052 A1* | 12/2008 | Chandrachari et al. | 707/200 |
| 2009/0006494 A1* | 1/2009 | Hong | G06F 11/0727 |
| 2009/0077097 A1* | 3/2009 | Lacapra et al. | 707/10 |
| 2009/0164535 A1* | 6/2009 | Gandhi et al. | 707/205 |
| 2009/0271412 A1* | 10/2009 | Lacapra et al. | 707/10 |
| 2009/0300084 A1* | 12/2009 | Whitehouse | 707/205 |
| 2010/0106695 A1* | 4/2010 | Calder | G06F 17/30501 |
| | | | 707/696 |
| 2011/0040795 A1* | 2/2011 | Gordon et al. | 707/792 |
| 2011/0060887 A1* | 3/2011 | Thatcher et al. | 711/171 |
| 2011/0106806 A1* | 5/2011 | Tamas | G06F 17/30091 |
| | | | 707/737 |
| 2011/0153606 A1* | 6/2011 | Kim et al. | 707/737 |
| 2011/0161496 A1* | 6/2011 | Nicklin | 709/226 |
| 2011/0167239 A1* | 7/2011 | Horn | G06F 17/30129 |
| | | | 711/171 |
| 2011/0218975 A1* | 9/2011 | Amit et al. | 707/693 |
| 2012/0011176 A1* | 1/2012 | Aizman | 707/822 |
| 2012/0030265 A1* | 2/2012 | Anderson et al. | 707/830 |
| 2012/0060035 A1* | 3/2012 | Kalmady | G06F 21/6209 |
| | | | 713/176 |
| 2012/0101991 A1* | 4/2012 | Srivas | G06F 8/68 |
| | | | 707/623 |
| 2012/0102316 A1* | 4/2012 | Resch et al. | 713/150 |
| 2012/0151245 A1* | 6/2012 | Chang et al. | 714/4.1 |
| 2012/0239860 A1* | 9/2012 | Atkisson et al. | 711/103 |
| 2012/0246382 A1* | 9/2012 | Wade et al. | 711/6 |
| 2013/0018932 A1* | 1/2013 | Bhaskar et al. | 708/203 |
| 2013/0054530 A1* | 2/2013 | Baker | G06F 17/30079 |
| | | | 707/639 |
| 2013/0110778 A1* | 5/2013 | Taylor et al. | 707/624 |
| 2013/0110779 A1* | 5/2013 | Taylor et al. | 707/624 |
| 2013/0117223 A1* | 5/2013 | Niki | 707/610 |
| 2013/0117503 A1* | 5/2013 | Nellans et al. | 711/103 |

OTHER PUBLICATIONS

"Unix Filesystem Organization", Worcester Polytechnic Institute, CS 4513 Course Notes, 2005, 14 pages, accessed on Jun. 18, 2013 from <http://web.cs.wpi.edu/~cs4513/b05/week2-unixfs.pdf>.
Princeton University COS 318 Precept Notes, Nov. 18, 2004, 4 pages, accessed on Jun. 18, 2013 from <https://www.cs.princeton.edu/courses/archive/fall04/cos318/precepts/6.pdf>.

\* cited by examiner

FILESYSTEM STORING FILE DATA IN LARGER UNITS THAN USED FOR METADATA

BACKGROUND

Files and directories are organized within filesystems of data storage so that they are readily-retrievable by users and applications. Filesystems make use of metadata in order to organize the data stored within the filesystem into files. Many filesystems are subdivided into blocks, which are the smallest units of data that are individually addressable and accessible within those filesystems. Blocks may vary in size between filesystems, with 512 bytes, 4 kilobytes (KB), and 8 KB being common block sizes. In addition, many filesystems make use of inodes and indirect blocks as types of metadata to store information about files, including the locations of blocks of data of particular files within the filesystem. For example, a typical filesystem stores one inode per file and that inode includes information about its respective file as well as pointers to one or more blocks of data of the file and (in some cases) pointers to indirect blocks. Each indirect block is a metadata construct that is also stored within a block of the filesystem. An indirect block contains a set of pointers to other blocks of data of the file or to other indirect blocks.

SUMMARY

Conventional file systems generally store all information, whether it be data or metadata, in uniformly-sized blocks. As the storage capacity of data storage systems increases, the amount of metadata stored within filesystems also increases. Therefore, as more and more files are loaded into memory, the amount of memory required to keep those files readily-accessible also increases. However, the amount of available system memory in data storage systems does not always grow as fast as the amount of storage, or as fast as the number of user requests that must be handled at any given time. Consequently, memory resources can become strained.

Some have tried addressing memory limitations by using larger block sizes. Although a larger block size increases the amount of data that can be addressed by any given amount of metadata, the size of metadata blocks themselves also increases, leading to diminishing returns and sometimes even a worse outcome. For example, the amount of metadata loaded into memory can actually increase when larger block sizes are used, particularly when accessing small files. In addition, if only small portions of files are accessed at once, providing larger metadata blocks means that more total metadata is loaded into memory than is loaded when using smaller block sizes.

Thus, it would be desirable for a filesystem to be able to access greater amounts of data for any given amount of metadata so as to relieve system memory, particular when accessing small files and/or small portions of files.

In contrast with the prior approach, improved techniques involve storing file data in larger allocation units than are used for storing metadata. The improved techniques thus allow larger amounts of data to be accessed for any given amount of metadata and avoid excessively burdening memory when accessing small files and/or small portions of files.

Some embodiments are directed to a method of storing files in a filesystem of a data storage system. The method includes (a) storing data of each file of a set of files of the filesystem in a set of data allocation units (AUs) of the filesystem on the data storage system, each data AU of the set of data AUs having a common data AU size, and (b) storing metadata pertaining to each file of the set of files in a set of metadata AUs of the filesystem on the data storage system, each metadata AU of the set of metadata AUs having a common metadata AU size, the common data AU size being larger than the common metadata AU size. Other embodiments are directed to a computerized apparatus and a computer program product configured to perform a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for storing file data in larger allocation units than are used for storing metadata. The improved techniques thus allow larger amounts of data to be accessed for any given amount of metadata and avoid excessively burdening memory when accessing small files and/or small portions of files.

Figure 1:
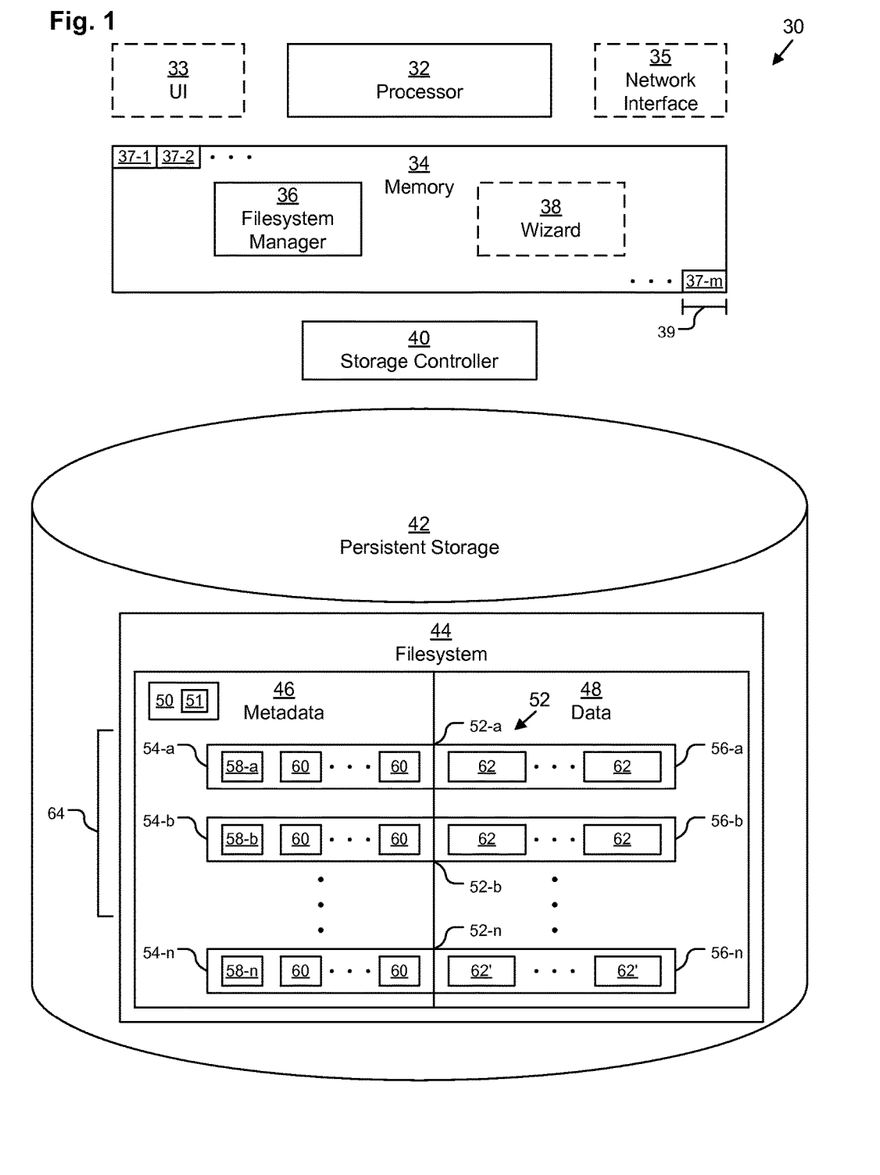
FIG. 1 depicts an example data storage system according to various embodiments.

FIG. 1 depicts an example data storage system (DSS) 30, such as, for example, a NAS data storage system, which provides access to one or more filesystems stored thereon. In some embodiments, DSS 30 may be a single computing device, such as, for example, a personal computer, a workstation, a server, an enterprise server, etc. In one particular example embodiment, DSS 30 is an enterprise data storage system including a cabinet housing multiple storage processors as well as multiple shelves of disk drives, flash drives, and/or solid state drives (SSDs). An example of an enterprise data storage system is the VNX series data storage system provided by the EMC Corp. of Hopkinton, Mass. In other embodiments, DSS 30 may be distributed across several computing devices or other structures.

DSS 30 includes one or more processor 32. Processor 32 may be any kind of processor or set of processors configured to perform operations, such as, for example, a microprocessor, a multi-core microprocessor, a digital signal processor, a collection of electronic circuits, or any combination of the above.

In some embodiments, DSS 30 also includes a network interface 35 and/or a user interface (UI) 33 which allow DSS 30 to communicate with a user via UI devices (not depicted). Optional UI 33 may include, for example, one or more of the following, a graphics adapter, a serial port, a parallel port, a Universal Serial Bus adapter, etc. UI devices may include input devices as well as output devices. Example UI devices include a display monitor and a keyboard. Other example UI devices could include a printer, a touch screen, a mouse, etc. Optional network interface 35 is configured to connect DSS 30 to a computer network, such as, for example, a local area network, a wide area network, the Internet, a storage area network, a fabric of interconnected hubs and switches, etc.

DSS 30 also includes memory 34. Memory 34 may include any kind of digital system memory, such as, for example, RAM. Memory 34 stores programs executing on processor 32 as well as data used by those programs. Memory 34 may store an operating system (OS) (not depicted) which runs on processor 32. Memory 34 stores a filesystem manager 36 which runs on processor 32 and serves to manage a filesystem stored within the DSS 30 in an improved manner in accordance with embodiments described herein. Memory 34 may also store a wizard 38, which may execute on processor 32 under certain circumstances in the context of various embodiments.

In addition to system memory for storing programs and data in active use by the processor 32, memory 34 may also include persistent storage (e.g., solid-state storage and/or disk-based storage) for storing programs and data even while the DSS 30 is powered off. In some embodiments, this persistent storage may additionally (or exclusively) be included within persistent storage 42. OS and filesystem manager 36 are typically stored both in system memory and in persistent storage so that they may be loaded into system memory from persistent storage upon a system restart.

The improved techniques described herein, when embodied in one or more non-transient computer-readable media (e.g., filesystem manager 36 stored within either system memory or persistent storage of memory 34), forms a computer program product. Also, the DSS 30, or portions thereof, forms a specialized circuit constructed and arranged to carry out the various processes described herein.

All or some of memory 34 may be arranged in a series of memory pages 37, depicted as memory pages 37-1, 37-2, . . . , 37-m. Each memory page 37 has a fixed size 39, such as, for example, 8 kilobytes (KB). As is well-understood in the art, if not all of the memory pages 37 are able to fit within the system memory portion of memory 34, some memory pages 37 may be stored on the persistent storage portion in a virtual memory arrangement until needed by the processor 32, at which point, one or more memory pages 37 may be paged into system memory at granularity of the memory page size 39, and other least-recently-used memory pages 37 may be paged back to the persistent storage portion.

DSS 30 also includes a storage controller 40 and persistent storage 42, such as one or more hard disk drives and SSDs connected either by an internal bus or via a network (e.g., a storage area network). Persistent storage 42 may be arranged in a fault tolerant arrangement, such as in a redundant array of independent disks (RAID), as is well-known in the art. Storage controller 40 provides the processor 32 and memory 34 with access to the persistent storage 42.

Persistent storage 42 stores at least one filesystem 44. Filesystem 44 includes both data 48 (i.e., user data stored by a user or application) as well as metadata 46 (e.g., information about the structure and layout of the data 48 within the filesystem 44). In some embodiments, metadata 46 includes a set of filesystem-descriptive metadata 50. Filesystem-descriptive metadata 50 may be stored within a superblock of the filesystem or another structure. Filesystem-descriptive metadata 50 may include, for example, the number of storage blocks within the filesystem 44, the size of the storage blocks, a number of inodes of the filesystem 44, an inode allocation bitmap, etc. Filesystem-descriptive metadata 50 may also include an indication 51 of a default size of a data allocation unit (AU).

Filesystem 44 may include a set of files 52 (depicted as files 52-1, 52-b, . . . , 52-n), each of which has a file metadata portion 54 (depicted as file metadata portions 54-1, 54-b, . . . , 54-n) and a file data portion 56 (depicted as file data portions 56-1, 56-b, . . . , 56-n). Each file metadata portion 54 includes an inode 58 (depicted as file-specific inodes 58-1, 58-b, . . . , 58-n). Each inode 58 points to one or more data AUs 62 of the corresponding file data portion 56. Some of the file metadata portions 54 may also contain one or more indirect pointer blocks 60, which point to data AUs 62 of the corresponding file data portion 56 beyond the maximum number of data AUs 62 that an inode 58 can directly point to (e.g., in some embodiments, each inode 58 may contain up to 18 pointers to data AUs 62; any additional data AUs 62 beyond 18 are pointed to indirectly via indirect pointer blocks 60). Each inode 58 is stored within exactly one metadata AU. Similarly, each indirect pointer block 60 is stored within exactly one metadata AU. In some embodiments, one metadata AU may be the same size as a storage block of the filesystem 44, which may be the same size as the memory page size 39. As depicted, the individual data AUs 62 are larger than the individual metadata AUs. In some embodiments, a subset 64 of the files 52 store their data 48 within data AUs 62 having a size defined by the indication 51 of the default size of the data AU 62, while one or more other files, e.g., file 52-n, stores its data 48 within non-default-sized data AUs 62' having a size different than the size defined by the indication 51 of the default size of the data AU. Typically even the size of most non-default-sized AUs 62' exceeds the size of one metadata AU, although there may be cases in which one or more non-default-sized AUs 62' may be the same size as one metadata AU.

Although a conventional filesystem stores data and metadata within blocks of a shared size, the DSS 30 depicted in FIG. 1 is advantageous because it allows filesystem data 48 to be stored in data AUs 62, 62' larger than a typical storage block, thereby requiring fewer pointers within the metadata 46, but the metadata 46 does not have to waste space by being stored in correspondingly large AUs—rather the metadata 46 (e.g., inodes 58 and indirect pointer blocks 60) may be stored within smaller metadata AUs.

Figure 2:
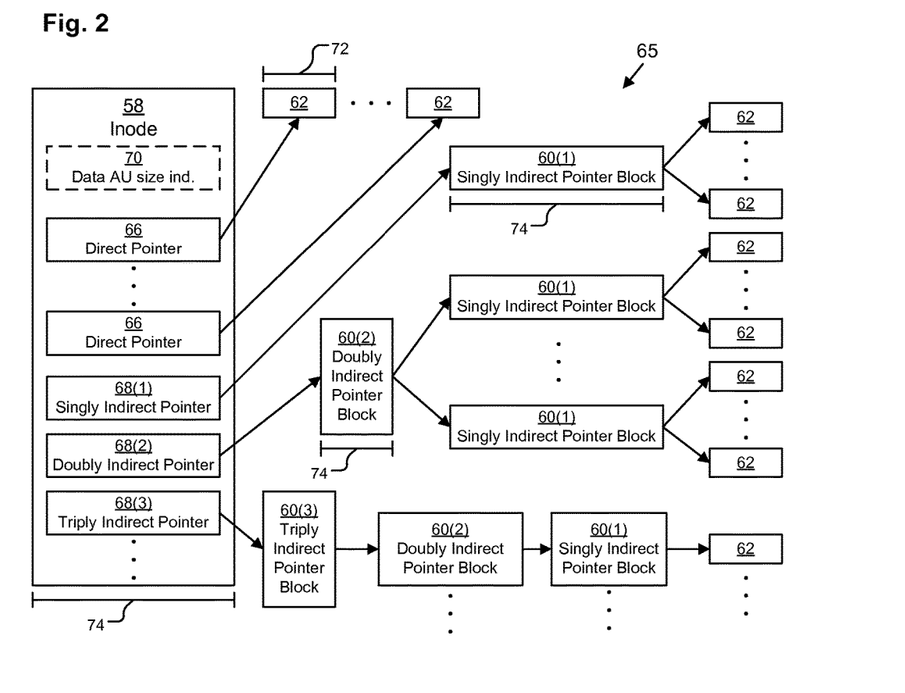
FIG. 2 depicts an example file structure for use with various embodiments.

FIG. 2 depicts an example file structure 65 of a file 52 within the context of filesystem 44 according to various embodiments. A file 52 contains one inode 58, which takes up one metadata AU, which has a metadata AU size 74 (typically equal to the size of a storage block and the memory page size 39, which is often 8 KB). The inode 58 contains a set of direct data pointers 66 as well as a set of indirect pointers 68. In one embodiment, inode 58 contains 18 direct data pointers 66, each direct data pointer 66 being 8 bytes (64 bits) in length and five indirect pointers 68, including a singly indirect pointer 68(1), a doubly indirect pointer 68(2), a triply indirect pointer 68(3), a quadruply indirect pointer 68(4) (not depicted), and a quintuply indirect pointer 68(5) (not depicted), each indirect pointer 68 also being 8 bytes in length.

Each direct data pointer 66 points to a data AU 62 in which data 48 of the file 52 is stored, although, if 18 data AUs 62 are not needed to store the entire data portion 56 of the file 52, one or more of the direct data pointers 66 may be left null, pointing to no data AU 62. If, however, more than 18 data AUs 62 are needed to store the data 48 of the file 52, singly indirect pointer 68(1) points to a singly indirect pointer block 60(1) having the metadata AU size 74, which, in turn contains a set of direct data pointers 66 (not depicted) that point to additional data AUs 62 of the file 52. In one embodiment, singly indirect pointer block 60(1) has the metadata AU size 74 (e.g., 8 KB) and contains 1024 8-byte direct data pointers 66 to data AUs 62 of the file 52, although, if 18+1024=1042 data AUs 62 are not needed to store all the data 48 of the file 52, one or more of the direct data pointers 66 may be left null, pointing to no data AU 62. If, however, more than 1042 data AUs 62 are needed to store the data 48 of the file 52, doubly indirect pointer 68(2) points to a doubly indirect pointer block 60(2) having the metadata AU size 74, which, in turn contains a set of singly indirect pointers 68(1) (not depicted) that point to additional singly indirect pointer blocks 60(1) having the metadata AU size 74, which in turn each point to up to 1024 data AUs 62 of the file 52. Similarly, if the file 52 contains more than 18+1024+$1024^2$ data AUs 62, then a triply indirect pointer block 60(3) is pointed to by triply indirect pointer 60(3) having the metadata AU size 74 which can indirectly point to up to $1024^3$ data AUs 62 via intervening doubly indirect pointer blocks 60(2) and singly indirect pointer blocks 60(1), as any person having ordinary skill in the art should understand. Similarly, if the file 52 contains more than 18+1024+$1024^2$+$1024^3$ data AUs 62, then a quadruply indirect pointer block 60(4) (not depicted) is pointed to by quadruply indirect pointer 60(4) (not depicted) having the metadata AU size 74 which can indirectly point to up to $1024^4$ data AUs 62 via intervening triply indirect pointer blocks 60(3), doubly indirect pointer blocks 60(2), and singly indirect pointer blocks 60(1), as any person having ordinary skill in the art should understand. Similarly, if the file 52 contains more than 18+1024+$1024^2$+$1024^3$+$1024^4$ data AUs 62, then a quintuply indirect pointer block 60(5) (not depicted) is pointed to by quintuply indirect pointer 60(4) (not depicted) having the metadata AU size 74 which can indirectly point to up to $1024^5$ data AUs 62 via intervening quadruply indirect pointer blocks 60(4), triply indirect pointer blocks 60(3), doubly indirect pointer blocks 60(2), and singly indirect pointer blocks 60(1), as any person having ordinary skill in the art should understand.

Each data AU 62 has a data AU size 72, which may be either defined by the indication 51 of the default size of a data AU 62 stored within the filesystem-descriptive metadata 50 or within a data AU size indication 70 stored within the inode 58.

In one embodiment, the indication 51 of the default size of a data AU 62 stored within the filesystem-descriptive metadata 50 may be an integer (e.g., 8) indicating that a default data AU 62 is that integer times larger than a metadata AU, in which case the metadata AU size 74 is that integer times larger than the data AU size 72. For example, the metadata AU size 74 may be 8 KB while the data AU size 72 in the default case is 8×8=64 KB. In some embodiments, the integer stored within the indication 51 of the default size of a data AU 62 must be an integral power of two. In other embodiments, the indication 51 of the default size of a data AU 62 stored within the filesystem-descriptive metadata 50 may be an integer (e.g., 3) indicating that a default data AU 62 is two raised to the power of that integer (e.g., $2^3$=8) times larger than a metadata AU. A typical default data AU size 72 would be 16 KB, 32 KB, 64 KB, or 128 KB, corresponding to an integer multiple of 2, 4, 8, 16, respectively (or an integer power of 1, 2, 3, or 4, respectively), for a typical 8 KB metadata AU size 72. However, any size is permitted, even as large as 256 megabytes or 1 gigabyte, although these large sizes would normally only be used in conjunction with a filesystem 44 having many extremely large files 52 which are usually accessed sequentially at high speeds.

If the default data AU 62 has a data AU size 72 of 64 KB, then each file 52 using the default settings may have a file size up to (18+1024+$1024^2$+$1024^3$+$1024^4$+$1024^5$)×64 KB=1,127,000,493,261,842×64 KB, which is approximately 65,600 petabytes (PB).

In some embodiments, the indication 51 of the default size of a data AU 62 may be overridden by having a data AU size indication 70 stored within the inode 58. The data AU size indication 70 may be stored in a similar manner as the indication 51 of the default size of a data AU 62, such as via an integer representing a multiple of the metadata AU size 74 or a power of two multiple of the metadata AU size 74. Thus, if the data AU size indication 70 stored within an inode 58-$n$ has a value of 16 representing an integer multiple, then the file 52-$n$ associated with that inode 58-$n$ has non-default-sized data AUs 62' with a size of 8 KB×16=128 KB, thereby allowing the file 52-$n$ to be up to about 131,200 PB in size. A typical non-default-sized data AU 62' might be 16 KB, 32 KB, 64 KB, or 128 KB, corresponding to an integer multiple of 2, 4, 8, 16, respectively (or an integer power of 1, 2, 3, or 4, respectively), for a typical 8 KB metadata AU size 74. However, any size is permitted, even as large as 256 megabytes or 1 gigabyte, although these large sizes would normally only be used in conjunction with an extremely large file 52-$n$ which is usually accessed sequentially at high speeds.

In some embodiments, although the indirect pointer blocks 60 have metadata AU size 74, the inode 58 may have a different size, such as 512 bytes.

Figure 3:
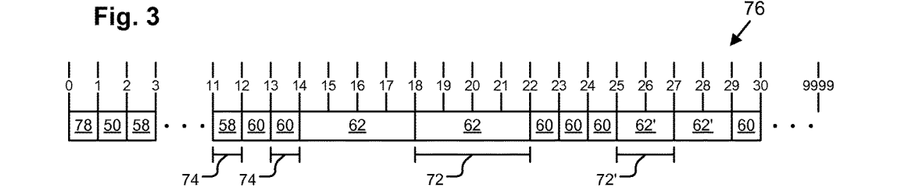
FIG. 3 depicts an example block layout of a filesystem according to various embodiments.

FIG. 3 depicts an example block layout 76 of a filesystem 44 according to various embodiments. As depicted, filesystem 44 contains 9999 blocks (so, at 8 KB per block, filesystem 44 has an addressable size of 79,992 KB, or almost 80 MB). A first block at address 0 contains the boot sector 78 of the filesystem 44 and a second block at address 1 contains the filesystem-descriptive metadata 50 (e.g., in a superblock). It should be understood that although the boot sector 78 and the filesystem-descriptive metadata 50 are each depicted as being exactly one block in size, this is by way of example only; in fact, the boot sector and the filesystem-descriptive metadata 50 may be of any respective sizes. Filesystem 44 as depicted contains ten inodes 58 each having a metadata AU size 74 of one block, each at a respective address from 2 through 11. Thus filesystem 44 may contain up to 10 files 52. Blocks 12 through 9998 may contain one of indirect blocks 60 (with metadata size 74 equal to 1 block) or default data AUs 62 (of default data AU size 72), or non-default AUSs 62' (of non-default data AU size 72'). As depicted in FIG. 3, the default data AU size 72 is 4 times the size of the metadata AU size 74, or 32 KB, while the depicted non-default data AU size 72' is 2 times the size of the metadata AU size 74, or 16 KB, although it should be understood that several different non-default data AU sizes 72' may be used within a single filesystem 44. Each AU 58, 60, 62, 62' may be addressed by the first block of that respective AU. Thus, a direct data pointer 66 within an inode 58-1 of a first file 52-1 is a 64-bit pointer to the first block of a default data AU 62 (e.g., block 14, interpreted as being a default data AU 62 four blocks in size), while a singly indirect pointer 68(1) within the same inode 58-1 is a 64-bit pointer to the first (and only) block of a metadata AU holding a singly indirect pointer block 68(1) (e.g., block 22, interpreted as being a metadata AU one block in size). On the other hand, a direct data pointer 66 within a different file 52-$n$ is a 64-bit pointer to the first block of a non-default data AU 62' (e.g., block 25, interpreted as being a non-default data AU 62' two blocks in size).

Figure 4:
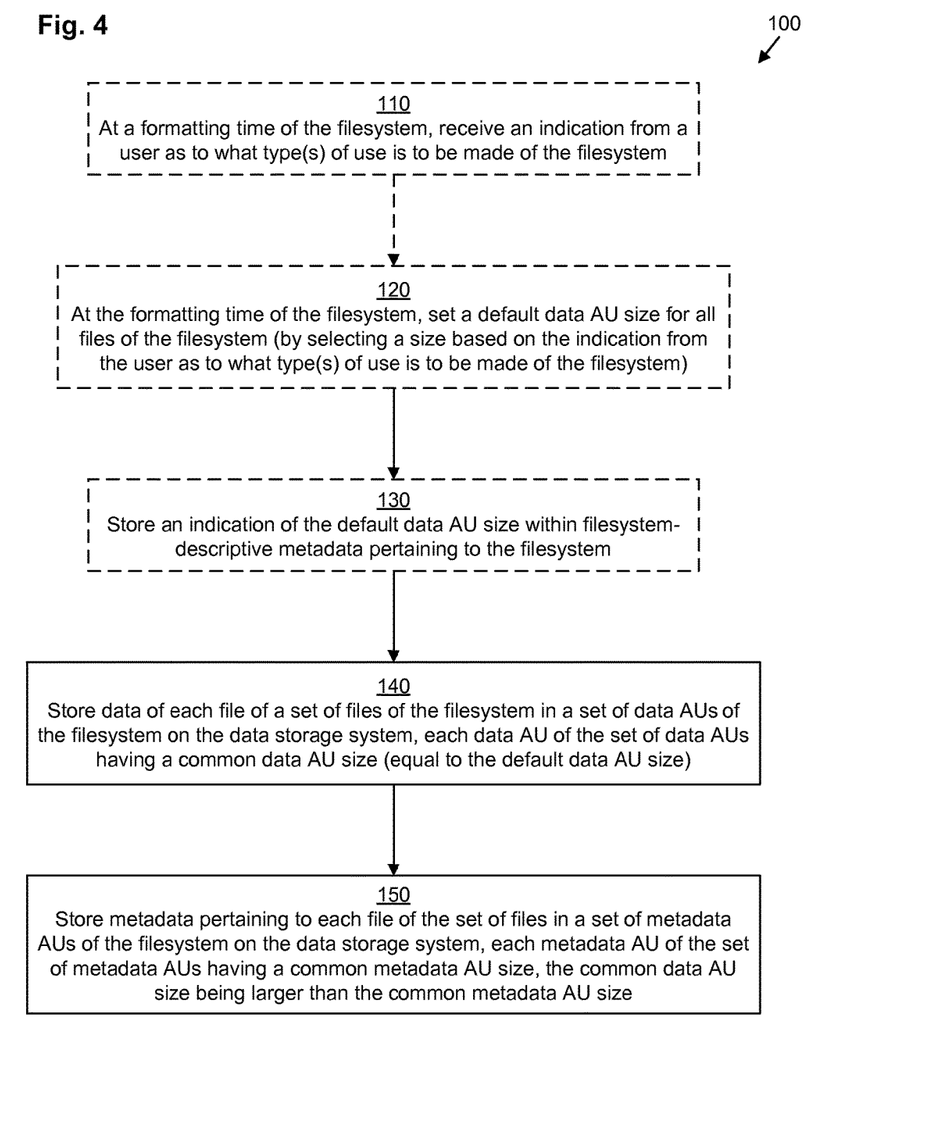
FIG. 4 depicts an example method according to various embodiments.

FIG. 4 depicts an example method 100 performed by the DSS 30 in accordance with various embodiments. Method 100 may be performed by filesystem manager 36, in conjunction with wizard 38 in some embodiments. It should be understood that any time a piece of software, such as, for example, filesystem manager 36, is described as performing a method, process, step, or function, in actuality what is meant is that a computing device (e.g., DSS 30) on which that piece of software is running performs the method, process, step, or function when executing that piece of software on its processor (e.g., processor 32). It should also be understood that, in some embodiments, instead of processor 32 executing code of filesystem manager 36, specialized circuitry of the DSS 30 operates to perform the method, process, step, or function directly in hardware.

In optional step 110, at a formatting time of a filesystem 44, filesystem manager 36 receives an indication from a user as to what type or types of uses are to be made of that filesystem 44. In one embodiment, this step is performed in conjunction with wizard 38, which queries (e.g., by prompting questions over a graphical user interface) the user via UI 33 or via a remote UI running on a remote machine accessible via network interface 35 regarding various types of standard uses for which the user may be intending to use the filesystem 44. Thus, for example, the wizard 38 may first query whether the user intends to use the filesystem 44 for e-mail. The wizard 38 may then query whether the user intends to use the filesystem 44 for database access. The wizard 38 may then query whether the user intends to use the filesystem 44 for video streaming.

In optional step 120, at the formatting time of the filesystem 44, filesystem manager 36 sets the default data AU size 72 for all files of the filesystem 44. This may be done in response to optional step 110 by selecting a size based on the indication from the user as to what type(s) of use is to be made of the filesystem 44 or it may be done based on a standard default setting. In the former case, for example, filesystem manager 36 may set the default data AU size 72 to 16 KB if the user has indicated via the wizard 38 that the primary use of the filesystem is for e-mail access, but to 32 KB if the user has indicated via the wizard 38 that the primary use of the filesystem is for database access. Similarly, filesystem manager 36 may set the default data AU size 72 to 128 KB if the user has indicated via the wizard 38 that the primary use of the filesystem is for video streaming. On the other hand, if the user has indicated multiple uses for the filesystem 44, then the filesystem manager 36 may select a default data AU size 72 by optimizing the appropriate block size for a combination of the indicated uses.

In optional step 130, filesystem manager 36 stores an indication 51 of the default data AU size 72 within filesystem-descriptive metadata 50 pertaining to the filesystem 44 (e.g., the superblock). Depending on the embodiment, the indication 51 stored within the filesystem-descriptive metadata 50 may be one of: (a) a size in bytes (or bits, etc.), (b) an integer to be interpreted as a multiple of the metadata AU size 74, or (c) an integer to be interpreted as an exponent of 2, the power of two defining a multiple of the metadata AU size 74.

It should be understood that steps 110-130 have been described as being optional because the remaining steps 140-150 can stand on their own, for example, in embodiments in which the default data AU size 72 for all files 52 of the filesystem 44 is pre-set in a non-configurable manner.

In step 140, for each file 52 (e.g., file 52-a) of a set 64 of files 52 for which the default metadata AU size is to be used, filesystem manager 36 stores the data 48 of that file 52-a in a set of data AUs 62 of the filesystem 44, each data AU 62 sharing a common data AU size (equal to the default data AU size 72).

It should be understood that, in some embodiments, all files 52 within the filesystem 44 have the default data AU size 72 such that it is not possible to override the default. In such embodiments, no data AU size indication 70 is stored within inodes 58.

In step 150, for each file 52 (e.g., file 52-a) of the set 64 of files 52 for which the default metadata AU size is to be used, filesystem manager 36 stores the metadata 46 pertaining to that file 52-a in a set of metadata AUs (e.g., inode 58-a and indirect blocks 60) of the filesystem 44, each metadata AU sharing a common metadata AU size 74, the common data AU size 72 being larger than the common metadata AU size 74. In some embodiments, the metadata AU size 74 is always the same as the block size of the filesystem 44, which is typically equal to the memory page size 39. A benefit of using the memory page size 39 as the metadata AU size 74 is that any metadata AU (e.g., an inode 58 or an indirect block 60) can be stored entirely within a single memory page 37, allowing for easily maintaining coherence between in-memory and persistent copies.

Figure 5:
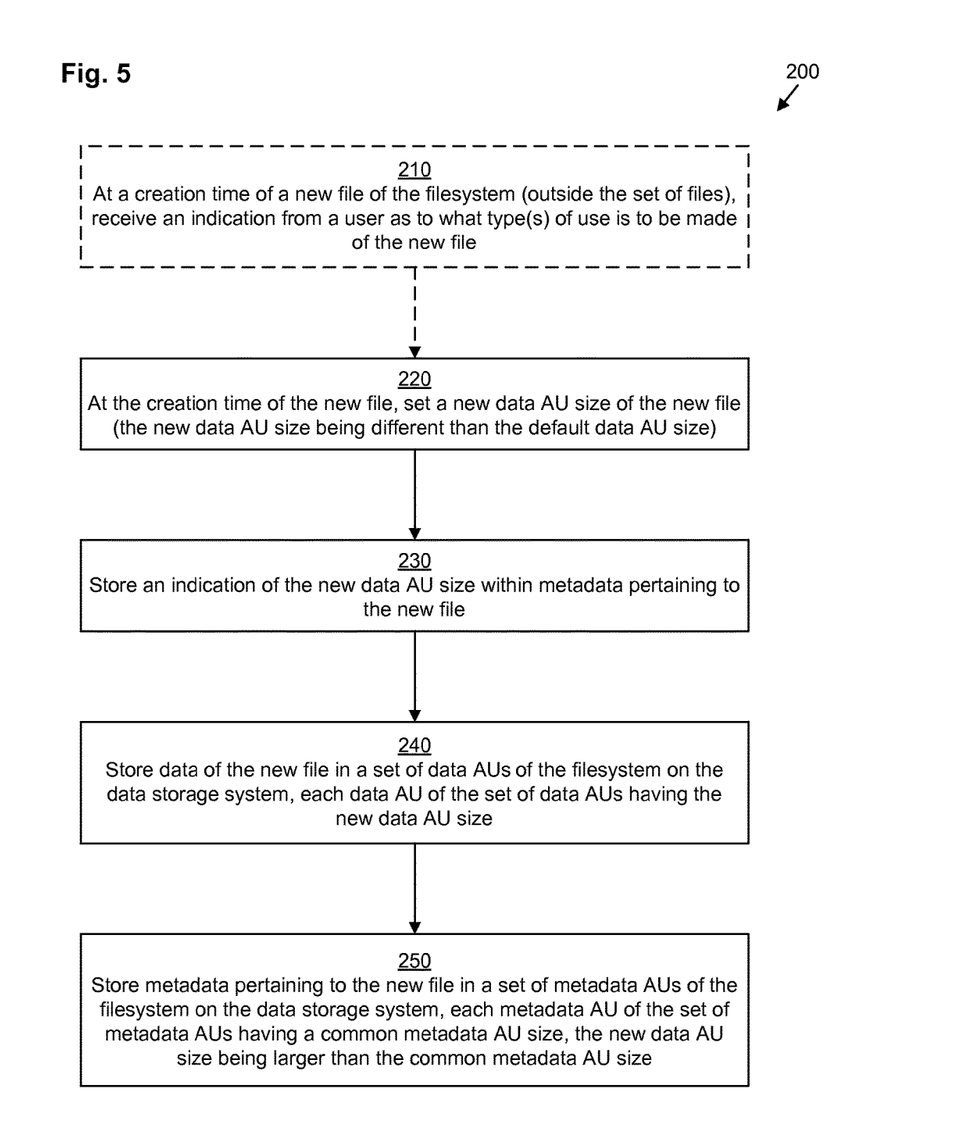
FIG. 5 depicts an example method according to various embodiments.

FIG. 5 depicts an example method 200 performed by the DSS 30 in accordance with various embodiments. Method 200 may be performed by filesystem manager 36, in conjunction with wizard 38 in some embodiments. Method 200 is typically performed after method 100 in the context of an embodiment having an overridable default data AU size. Method 200 may also be performed standalone, such as in the context of an embodiment in which there is no default data AU size 72, but rather every file 52 has its own non-default data AU size 72'.

In optional step 210, at a creation time of a new file 52 (e.g., a new file 52-n not within the set 64 of files 52 having a default data AU size 72), filesystem manager 36 receives an indication from a user as to what type or types of uses are to be made of that new file 52-n. In one embodiment, this step is performed in conjunction with wizard 38, which queries the user via UI 33 or via a remote UI running on a remote machine accessible via network interface 35 regarding various types of standard uses that the user may be intending to use the new file 52-n for. Thus, for example, the wizard 38 may first query whether the user intends to use the new file 52-n as an e-mail mailbox file. The wizard 38 may then query whether the user intends to use the new file 52-n as a database. The wizard 38 may then query whether the user intends to store streamable video within the new file 52-n.

It should be understood that step 210 has been described as being optional because the remaining steps 220-250 can stand on their own, for example, in embodiments in which the non-default data AU size 72' for a new file 52-n is directly entered by a user.

In step 220, at the creation time of the new file 52-n, filesystem manager 36 sets the non-default data AU size 72' for that new file 52-n. This may be done in response to optional step 210 by selecting a size based on the indication from the user as to what type(s) of use is to be made of the new file 52-n or it may be done based on the user directly inputting the desired non-default data AU size 72' for the new file 52-n. In some embodiments, if the user does not provide either a desired non-default data AU size 72' or some indication as to what type(s) of use is to be made of the new file 52-n, then by default the filesystem driver sets the non-default data AU size 72' to be equal to the default data AU size 72. Otherwise, for example, filesystem manager 36 may set the non-default data AU size 72' to 16 KB if the user has indicated via the wizard 38 that the new file 52-*n* will be an e-mail mailbox file, but to 32 KB if the user has indicated via the wizard 38 that the new file 52-*n* will be a database. Similarly, filesystem manager 36 may set the non-default data AU size 72' to 128 KB if the user has indicated via the wizard 38 that the new file 52-*n* will store streamable video.

In step 230, filesystem manager 36 stores a data AU size indication 70 of the non-default data AU size 72' within metadata 46 pertaining to the new file 52-*n*. For example, in one embodiment, the data AU size indication 70 is stored within the inode 58-*n* of the new file 52-*n*. Depending on the embodiment, the data AU size indication 70 stored within the inode 58-*n* may be one of: (a) a size in bytes (or bits, etc.), (b) an integer to be interpreted as a multiple of the metadata AU size 74, or (c) an integer to be interpreted as an exponent of 2, the power of two defining a multiple of the metadata AU size 74.

In step 240, filesystem manager 36 stores the data 48 of the new file 52-*n* in a set of non-default-sized data AUs 62' of the filesystem 44, each non-default-sized data AU 62' sharing the non-default data AU size 72'.

In step 250, filesystem manager 36 stores the metadata 46 pertaining to the new file 52-*n* in a set of metadata AUs (e.g., inode 58-*n* and indirect blocks 60) of the filesystem 44, each metadata AU sharing a common metadata AU size 74, the com non-default data AU size 72' being larger than the common metadata AU size 74.

Thus, techniques have been described for storing file data 56 in larger allocation units 62, 62' than are used for storing metadata 54. The improved techniques thus allow larger amounts of data 48 to be accessed for any given amount of metadata 46 and avoid excessively burdening memory 34 when accessing small files and/or small portions of files.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described in which all metadata 46 of a file 52 is stored in metadata AUs having a same size, this is by way of example only. In certain embodiments, multiple metadata AU sizes 74 may be used for different types of metadata 46 pertaining to a file 52. For example, inodes 58 may be smaller than the metadata AU size 74 for the indirect blocks 60. As an additional example, certain higher-order indirect blocks 60 (e.g., quintuply indirect pointer blocks 60(5), quadruply indirect pointer blocks 60(4), and triply indirect pointer blocks 60(3)) may use a larger metadata AU size 74 of, for example, 16 KB, while lower-order indirect blocks 60 (e.g., doubly indirect pointer blocks 60(2), and singly indirect pointer blocks 60(1)) may use a smaller metadata AU size 74 of, for example, 8 KB. In some embodiments, an indication of the default relative sizes of different types of metadata AUs is stored within the filesystem-descriptive metadata 50. In some embodiments, an indication of the file-specific relative sizes of different types of metadata AUs is stored within the inode 58 (e.g., in data AU size indication 70).

As an additional example, although various embodiments have been described in which all data 48 of a particular file 52 is stored in data AUs 62, 62' having a same size, this is by way of example only. In certain embodiments, multiple metadata AU sizes 74 may be used for different types of metadata 46 pertaining to a file 52. For example, in on embodiment, data AUs 60 pointed to by direct data pointers 66 from the inode 58 are of one size while data AUs 60 pointed to by indirect blocks 60 are of a different size.

In addition, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background" or "conventional," Applicants make no admission that such technique, method, apparatus, or other concept is actually prior art under 35 U.S.C. § 102, such determination being a legal determination that depends upon many factors, not all of which are known to Applicants at this time.

What is claimed is:

1. A method of storing files in a filesystem of a data storage system, the method comprising:
   storing data of each file of a set of files of the filesystem in a set of data blocks of the filesystem on the data storage system, each data block of the set of data blocks having a shared data block size;
   storing metadata pertaining to each file of the set of files in a set of metadata blocks of the filesystem on the data storage system, each metadata block of the set of metadata blocks having a shared metadata block size, the shared data block size being larger than the shared metadata block size by an integer factor, the integer being greater than one, the shared metadata block size being equal to a memory page size of the data storage system;
   storing an indication of a default data block size within filesystem-descriptive metadata pertaining to the filesystem;
   at a formatting time of the filesystem, setting the shared data block size as the stored default data block size for all files of the filesystem;
   at a creation time of a new file of the filesystem outside the set of files, setting a new data block size of the new file, the new data block size being different than the default data block size;
   storing an indication of the new data block size within metadata pertaining to the new file;
   storing data of the new file in another set of data blocks of the filesystem on the data storage system, each data block of the other set of data blocks having the new data block size; and
   storing metadata pertaining to the new file in another set of metadata blocks of the filesystem on the data storage system, each metadata block of the other set of metadata blocks having the shared metadata block size, the new data block size being larger than the shared metadata block size.

2. The method of claim 1, further comprising, at the formatting time of the filesystem, receiving an indication from a user as to what type(s) of use is to be made of the filesystem;

wherein setting the default data block size for all files includes selecting a size based on the indication from the user as to what type(s) of use is to be made of the filesystem.

3. The method of claim 2,
wherein receiving the indication from the user as to what type(s) of use is to be made of the filesystem includes interacting with the user via a wizard that prompts the user for the types(s) of applications that are to be used with the filesystem; and
wherein selecting the size based on the indication from the user includes selecting the size based on the interaction between the wizard and the user.

4. The method of claim 1, further comprising:
at the creation time of the new file, receiving an indication from a user as to as to what type(s) of use is to be made of the new file; and
setting the new data block size of the new file includes:
  selecting the default data block size when the user provides a null indication; and
  otherwise, selecting a size based on the indication from the user as to what type(s) of use is to be made of the new file.

5. The method of claim 4,
wherein receiving the indication from the user as to what type(s) of use is to be made of the new file includes interacting with the user via a wizard that prompts the user for the types(s) of applications that are to be used with the new file; and
wherein selecting the size based on the indication from the user includes selecting the size based on the interaction between the wizard and the user.

6. The method of claim 1, wherein storing the indication of the default data block size within filesystem-descriptive metadata pertaining to the filesystem includes storing the integer within the filesystem-descriptive metadata pertaining to the filesystem.

7. The method of claim 1,
wherein each data block of the set of data blocks includes a number of sequential blocks of the data storage system equal to the integer; and
wherein the metadata pertaining to each file of the set of files includes a block pointer to a first block of each data block of the set of data blocks for that file.

8. The method of claim 1 wherein the memory page size of the data storage system is 8 kilobytes.

9. The method of claim 8 wherein the integer is an integral power of two.

10. The method of claim 9 wherein the integer is equal to 4.

11. The method of claim 9 wherein the integer is equal to 8.

12. The method of claim 9 wherein the integer is equal to 16.

13. The method of claim 1, wherein:
the metadata blocks of the set of metadata blocks include inode blocks and indirect blocks, the inode blocks storing a plurality of inodes, the inodes and the indirect blocks storing pointers that point to indirect blocks and pointers that point to data blocks; and
the data blocks are each a collection of a plurality of contiguous storage blocks.

14. The method of claim 1, wherein the set of metadata blocks includes a set of indirect blocks, each of the set of indirect blocks storing pointers that point to at least one of other indirect blocks and data blocks.

15. The method of claim 1, wherein:
the shared metadata block size is the smallest unit of metadata storage that can be allocated by the filesystem; and
the shared data block size is the smallest unit of data storage that can be allocated by the filesystem.

16. An apparatus comprising:
data storage; and
a controller, the controller being configured to:
  store data of each file of a set of files of a filesystem in a set of data blocks of the filesystem on the data storage, each data block of the set of data blocks having a shared data block size;
  store metadata pertaining to each file of the set of files in a set of metadata blocks of the filesystem on the data storage, each metadata block of the set of metadata blocks having a shared metadata block size, the shared data block size being larger than the shared metadata block size by an integer factor, the integer being greater than one, the shared metadata block size being equal to a memory page size of the apparatus;
  store an indication of a default data block size within filesystem-descriptive metadata pertaining to the filesystem;
  at a formatting time of the filesystem, setting the shared data block size as the stored default data block size for all files of the filesystem;
  at a creation time of a new file of the filesystem outside the set of files, setting a new data block size of the new file, the new data block size being different than the default data block size;
  storing an indication of the new data block size within metadata pertaining to the new file;
  storing data of the new file in another set of data blocks of the filesystem on the data storage, each data block of the other set of data blocks having the new data block size; and
  storing metadata pertaining to the new file in another set of metadata blocks of the filesystem on the data storage, each metadata block of the other set of metadata blocks having the shared metadata block size, the new data block size being larger than the shared metadata block size.

17. The apparatus of claim 16 further comprising memory, the memory having the memory page size, the memory being accessible in increments of the memory page size.

18. A computer program product comprising a non-transitory computer-readable storage medium storing a set of instructions, which, when executed by a data storage computer, causes the data storage computer to perform the operations of:
  storing data of each file of a set of files of a filesystem in a set of data blocks of the filesystem on persistent storage connected to the data storage computer, each data block of the set of data blocks having a shared data block size;
  storing metadata pertaining to each file of the set of files in a set of metadata blocks of the filesystem on the persistent storage connected to the data storage computer, each metadata block of the set of metadata blocks having a shared metadata block size, the shared data block size being larger than the shared metadata block size by an integer factor, the integer being greater than one, the shared metadata block size being equal to a memory page size of the data storage computer;

storing an indication of a default data block size within filesystem-descriptive metadata pertaining to the filesystem;

at a formatting time of the filesystem, setting the shared data block size as the stored default data block size for all files of the filesystem;

at a creation time of a new file of the filesystem outside the set of files, setting a new data block size of the new file, the new data block size being different than the default data block size;

storing an indication of the new data block size within metadata pertaining to the new file;

storing data of the new file in another set of data blocks of the filesystem on the persistent storage, each data block of the other set of data blocks having the new data block size; and storing metadata pertaining to the new file in another set of metadata blocks of the filesystem on the persistent storage, each metadata block of the other set of metadata blocks having the shared metadata block size, the new data block size being larger than the shared metadata block size.

* * * * *